United States Patent [19]

Daboub

[11] Patent Number: 4,718,660

[45] Date of Patent: Jan. 12, 1988

[54] ANTI-JAMMING MEANS FOR A POCKET OF A MAIL SORT MACHINE

[76] Inventor: Henry A. Daboub, 1420 Grand Teton, DeSoto, Tex. 75115

[21] Appl. No.: 785,875

[22] Filed: Oct. 9, 1985

[51] Int. Cl.$^4$ ............... B65H 39/10; B65H 29/38; B07C 9/00

[52] U.S. Cl. .................... 271/305; 209/657; 271/177

[58] Field of Search .......... 271/177, 180, 287–291, 271/296, 297, 298, 303, 305, 181; 414/51, 103, 107; 53/542; 209/657

[56] References Cited

U.S. PATENT DOCUMENTS

| | | | |
|---|---|---|---|
| 2,497,149 | 2/1950 | Berdis et al. | 271/303 |
| 3,266,798 | 8/1966 | Bleiman | 271/181 X |
| 3,709,492 | 1/1973 | Baker et al. | 271/290 |
| 3,750,880 | 8/1973 | Petrovsky et al. | 271/305 |
| 3,957,264 | 5/1976 | Bach et al. | 271/296 |
| 4,275,875 | 6/1981 | Akers | 271/305 |
| 4,339,119 | 7/1982 | Sasaki et al. | 271/180 |
| 4,441,702 | 4/1984 | Nagel et al. | 271/177 |

OTHER PUBLICATIONS

Kobus, *Variable Sheet Deflector for Document Restacking*, Xerox Disc. Jol., vol. 6, No. 5, Sep./Oct. 1981, p. 237.

Primary Examiner—Andres Kashnikow
Assistant Examiner—Robert J. Oberleitner
Attorney, Agent, or Firm—Drude Faulconer

[57] ABSTRACT

An anti-jamming diverter comprising a kicker gate at each pocket of a mail sort machine for "kicking" the tail of a letter away from the point of entry into the pocket so that the next letter can enter the pocket without jamming. The kicker gate, when actuated, aligns with the actuated gate of the pocket to allow smooth entry of a letter from the transport into the pocket. Upon deactuation, the kicker returns to its original position thereby "kicking" the tail of the letter inwardly into the pocket.

8 Claims, 4 Drawing Figures

ANTI-JAMMING MEANS FOR A POCKET OF A MAIL SORT MACHINE

DESCRIPTION

1. Technical Field

The present invention relates to a machine used for sorting documents, e.g. mail, and more particularly relates to a means for moving a letter or the like into a stacker pocket of a mail sort machine so that the next letter can easily enter said pocket without jamming.

2. Background Art

In recent years, automated equipment has been developed for handling large volumes of documents, (e.g. letters, postcards, checks, and the like). For example, mail sort machines have been developed and widely used for automatically sorting large volumes of letters into specified groups having the same or similar Zip Codes for more efficient handling and/or to benefit from reduced postage rates normally charged for such presorted mail.

One well known type of such an automatic mail sort machine is one which is comprised of a feeder section and one or more stacker sections attached thereto. Each stacker section includes a transport mechanism and a plurality of horizontal storage bins or "pockets". A batch of letters is fed through the feeder section and past a reader (e.g. optical character or bar code reader) which reads a sort code (Zip Code) on each envelope and generates a signal representative thereof. This signal is processed by a computer which, in turn, outputs a designation signal which triggers a diverter or "gate" on a designated pocket to divert the letter from the transport mechanism into said pocket where it is stacked with other letters having the same codes. An example of such a machine is the MS-1200 Mail Sorter, manufactured by National Presort, Inc., Dallas, Texas.

One problem that exists in such machines arises from the occasional jamming of letters as they are diverted into their designated pockets. The primary cause of this jamming is that the "tail" of a letter is not sufficiently moved away from the gate and into the pocket so that the next letter into that pocket does not have clear access thereto. The leading edge of the next letter engages the tail of the last letter in the pocket and a "jam" occurs.

In prior art machines, a "beater" is incorporated into the pocket downstream of the gate and near the point of entry of the letter into the pocket. The beater comprises a triangularly-shaped head or a plurality of elongated spring fingers mounted on a shaft which are continuously rotated thereby. The rotating head or fingers intermittedly engage the last letter into the pocket to hold the tail of the letter away from the point of entry thereby allowing the next letter to clear the tail of the last letter and smoothly enter the pocket.

However, since beaters of this type are continuously "beating" on the last letter into a pocket, and, if a new letter is not soon forthcoming, serious wear and/or damage to the last letter can occur. Further, due to continous rotation of the beaters (one at each pocket), the noise generated thereby can, at times, exceed desirable levels, thereby requiring operators of the machine to wear ear protection for their comfort.

DISCLOSURE OF THE INVENTION

The present invention provides an anti-jamming diverter means for diverting a document into a pocket of a mail sort machine from a document transport through the machine. As used herein, "documents" means letters, postcards, checks, and similar items. The diverter means of the present invention provides a means at each pocket of the stacker section of the machine for "kicking" the tail of a letter away from the point of entry into the pocket so that the next letter can enter the pocket without jamming.

The present diverter means comprises a kicker gate which, when actuated, aligns with the actuated gate of a pocket to allow smooth entry of a letter from the transport into the pocket. Upon deactuation, the kicker returns to its original position thereby "kicking" the tail of the letter inwardly into the pocket and away from the point of entry. Preferably, the kicker gate is incorporated into a pocket module which also includes the gate for the pocket and the transport for the document through the module. This allows the module to be removed for repair and/or maintenance thereby simplifying maintenance and reducing downtime of the machine.

In another embodiment of the present invention, the gate and the kicker gate, as described above, are combined into a single gate element. The gate element, when in its first or deactuated position, extends inwardly into the pocket at an angle with respect to the centerline of the document transport. When actuated, the gate element moves to a second position where it intersects the transport to thereby divert a document into the pocket. Upon deactuation of the gate element, it returns to its original position thereby kicking the tail of the document into the pocket and away from the point of entry into the pocket.

In both embodiments, the kicker gate is actuated only when a letter is to enter the pocket so it is not continuously operating as do the beaters used in the prior art. Accordingly, wear on the letter caused by the constant "beating" on the letter is eliminated and due to the precise, limited action of the kicker gate, the overall noise level of the sort machine is greatly reduced.

BRIEF DESCRIPTION OF THE DRAWINGS

The actual construction, operation, and apparent advantages of the present invention will be better understood by referring to the drawings in which like numeral identify like parts and in which.

BEST MODE FOR CARRYING OUT THE INVENTION

Figure 1:
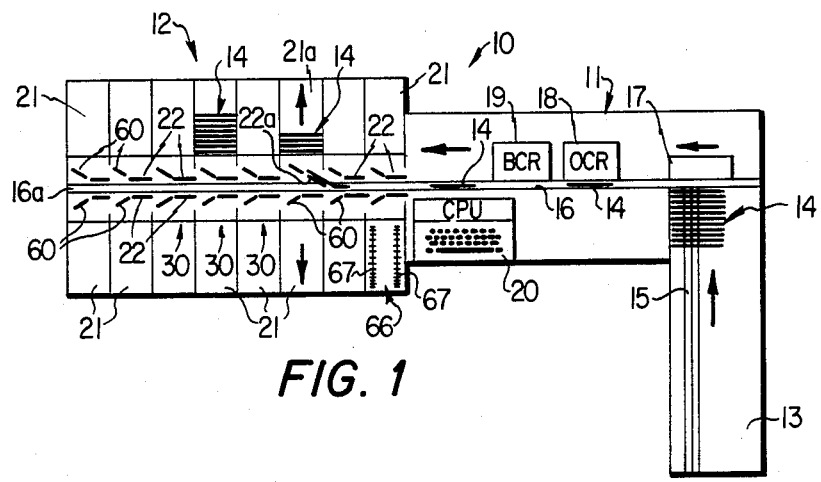
FIG. 1 is a plan or top view of a typical mail sort machine which incorporates the present invention.

Referring more particularly to the drawings, FIG. 1 is a plan view of mail sort machine 10 which is comprised of a feeder section 11 and a stacker section 12. The feeder section 11 is comprised of a magazine 13 onto which a batch of letters 14 are positioned. Conveyor 15 (e.g. motor driven chain-link belts) feed letters 14 forward onto pickoff 17 which picks off one letter at a time and put it on transport 16. Pickoff 17 is preferably vacuum operated which pulls a letter against a moving belt which, in turn, carries the letter into "pinch" with driven rollers (not shown) which, in turn, propel the letter through the centerline track of transport 16 and into transport 16a of stacker section 12.

As the letter passes by optical character reader 18 or bar code reader 19, a sort code (e.g. Zip Code or bar code, respectively) on the envelope of letter 14 is read by the appropriate reader which, in turn, generates signal representative of the sort code. These signals are then processed in computer 20 which outputs a designation signal to stacker section 12.

Stacker section 12, as shown, is comprised of a plurality, horizontal stacker bins or "pockets" 21 arranged in pairs having one pocket on either side of the transport 16a. Each pocket 21 has a diverter means (i.e., gate 22, only some of which are numbered in FIG. 1 for clarity) which is actuated by the designation signal from computer 20 as letter 14 approaches its designated pocket. Gate 22, when actuated, temporarily intersects transport 16a, shown as 22a (FIGS. 1 and 2), to thereby divert letter 14 from the centerline transport 16a of stacker section 12 into pocket 21a. The construction and operation of sort machine 10 as described up to this point is well known, e.g. Models MS-1100 and MS-1200 Mail Sorter, manufactured and distributed by National Presort, Inc., Dallas, Tex. For a more complete description of an example of tracking electronics involved in actuating the proper gate 22 in response to a particular designation signal, see U.S Pat. No. 4,247,008 which is incorporated herein by reference.

Figure 2:
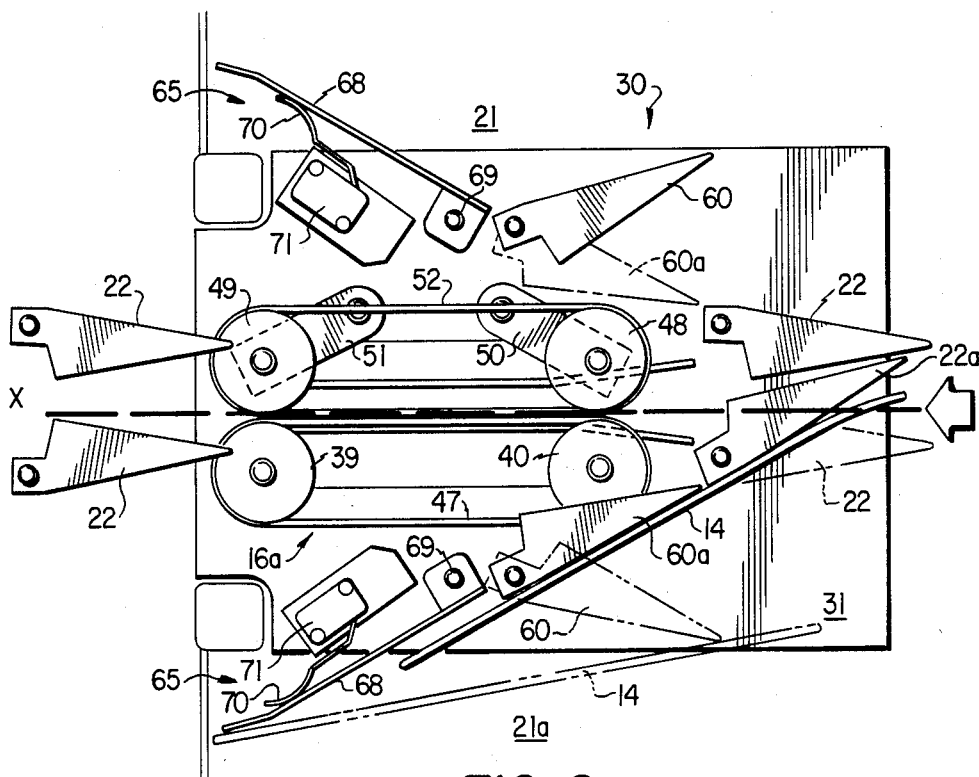
FIG. 2 is a plan or top view of the pocket module of the present invention.
Figure 3:
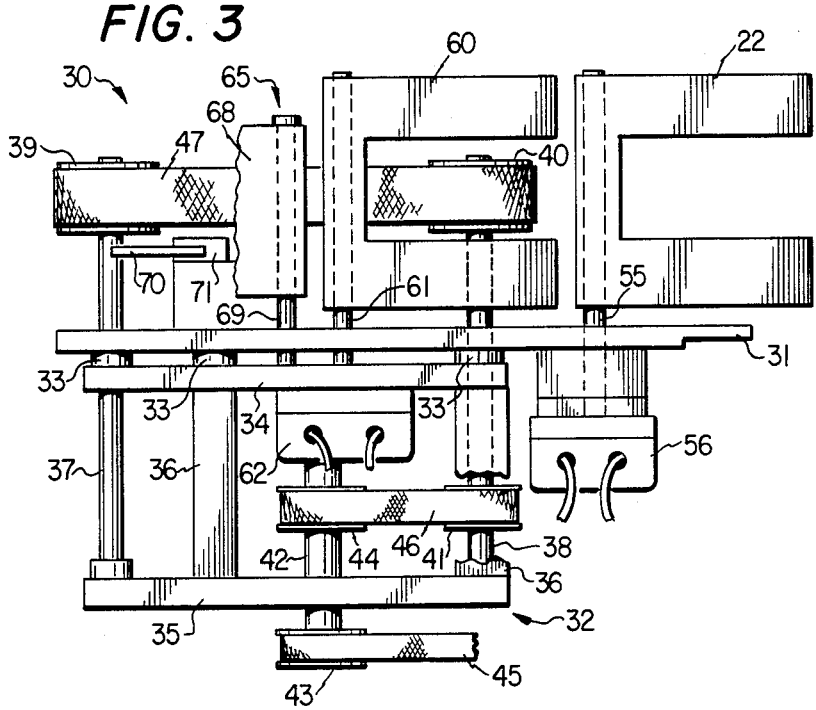
FIG. 3 is an elevational or side view, partly in section, of the module of FIG. 2.

Turning now to FIGS. 2 and 3, a pocket module 30 incorporating the anti-jamming means of the present invention is disclosed. There is one module 30 for each pair of opposed pockets 21 (e.g. eight modules for sixteen pockets in FIG. 1) which can be quickly and easily removed for repair or maintenance. Each module 30 includes a pair of gates 22 and a stacker transport segment 16 which will be described in detail below. While the present invention will be described in relation to module 30, it should be understood that it can also be used in machines where the gates and stacker transport are incorporated directly on the deck of a stacker section, e.g. Models RA-4 and RA-9, manufactured by Bell and Howell, Chicago, Ill.

As shown in FIGS. 2 and 3, module 30 is comprised of base plate 31 which is isolated from module frame 32 by rubber washers or grommets 33 or the like for sound attenuation purposes. Frame 32 is comprised of upper plate 34 and lower plate 35 which are connected together by standoffs 36. Shafts 37 and 38 are journalled on lower plate 35 and extend upward through upper plate 34 and base plate 31 and have pulleys 39 and 40, respectfully, affixed to their upper ends. Shaft 38 also has a second pulley 41 affixed thereto between said upper and lower plates.

Shaft 42 is journalled on upper plate 34 and extends downward through lower plate 35 and has pulley 43 affixed to its lower end. Shaft 42 also has a second pulley 44 thereon aligned with pulley 41 on shaft 38. Pulley 43 is adapted to be driven by belt 45 which, in turn, is driven, directly or indirectly, by a motor (not shown) mounted in stacker section 12. Shaft 42, in turn, drives shaft 38 through belt 46, which, in turn, drives transport belt 47 mounted on pulleys 39 and 40.

As best seen in FIG. 2, two idler pulleys 48 and 49 are mounted on arms 50 and 51, respectfully, which, in turn, are rotatably mounted on base plate 31. Belt 52 is mounted on pulleys 48 and 49, and provides the "pinch" of a letter aainst driven belt 47 so that a letter will be transported through module 30 to the next adjacent module if the letter is not to be diverted to a pocket controlled by that particular module 30.

As will be understood, each individual module 30 will control the diversion if letters into one or the other of a pair of opposed pockets 21 by the actuation of a proper gate 22. Each gate 22 (two gates on each module) is affixed to the upper end of the shaft 55 of an individual rotational solenoid 56, which is mounted on upper plate 34. Solenoid 56 is of the type that rotates in one direction against the bias of an internal spring when actuated and which is rotated in the other direction by the spring force when deactuated. An example of such a solenoid is Model 188131-001 (Right-hand or Left-hand), manufactured by Ledex, Inc., Vandalia, Ohio.

Gate 22, when in a deactuated or first position, lies substantially parallel to the centerline X of transport 16a and intersects said centerline when actuated to a second position.

A kicker gate 60 which may have substantially the same configuration as gate 22 is provided for each pocket 21 and is mounted on the upper end of a shaft 61 of a rotational solenoid 62 which is mounted on upper plate 34. Solenoid 62 is of the same type as solenoid 56. When deactuated in a first position, kicker gate 60 extends inwardly into pocket 21 at an approximate 30° angle with respect to the letter path (centerline X in FIG. 2) through transport 16a and when actuated and in a second position is moved into alignment with actuated gate 22 (see kicker 60a and gate 22a, FIG. 2). A more detailed discussion of the operation of kicker 60 will follow below.

Also provided on module 30 for each pocket 21 is a means 65 for actuating a "takeway" means 66 for moving the stack of letters in a particular pocket further into the pocket as they accumulate therein. Takaway means 66 (only one illustrated on FIG. 1 for clarity) is comprised of a pair of parallel conveyor belts or chains 67 which are journalled through the deck of a pocket and which extend substantially from the front to the back of a pocket. A motor (not shown) drives the conveyor 67 upon a signal from means 65 to periodically move letters back into the pocket. Means 65 is comprised of bump plate 68 which is pivotably mounted on base plate 31 via pin 69. Plate 68 is positioned to engage arm 70 of switch 71. As letters accumulate in pocket 21, they will exert pressure on bump plate 68 forcing it against arm 70 to turn switch 71 on to operate the motor of means 66 to move conveyor 67. When the letters are moved by conveyor 67, the pressure against bump plate 68 is relieved and plate 68 returns to its original position by a spring (not shown), thereby turning off switch 71.

With the structure having been disclosed, the operation of sort machine 10 will now be set forth. A batch of documents (e.g. letters) are placed on magazine 13 and are fed one by one into transport 16 by pickoff 18. As each letter passes reader 17 or 19, a sort code on the letter is read and a cooresponding signal is supplied to computer 20 which, in turn, outputs a designation signal for that particular letter. This signal is fed to the tracking circuitry (see U.S. Pat. No. 4,247,008) in stacker section 12. As the letter 14 approaches the particular pocket 21 in which it is to be stacked, the designation signal actuates solenoid 56 for the gate 22 which controls the designated pocket. At the same time, the designation signal also actuates the solenoid 62 for the kicker gate 60 of the same pocket.

Solenoid 56 rotates gate 22 to intersect the centerline of transport 16a (see gate 22a, FIG. 2) while solenoid 62 rotates kicker gate 60 into alignment with the gate 22a (see kicker gate 60a, FIG. 2). Letter 14 is diverted by gate 22a into its designated pocket 21a and it smoothly moves completely into the pocket. As the letter clears gate 22a, solenoid 56 is deactuated and the internal spring force of the solenoid returns gate 22a to its original first position. The deactuation of solenoid 62 is delayed slightly (e.g. 50 milliseconds) to allow letter 14 to complete its entry into pocket 21a. Solenoid 62 is then deactuated and the internal spring force of the solenoid returns kicker gate 60 to its original or first position thereby "kicking" the tail of letter 14 inwardly away from the point of entry into the pocket. Kicker gate 60 holds the letter away until the next letter is ready to enter the pocket.

As the next letter which is destined for the same pocket approaches, the above sequence is repeated. As kicker gate 60 is actuated, it will move inward to its aligned position, much faster than the tail of letter 14 can follow, thereby allowing the next letter to smoothly enter the pocket without jamming.

Figure 4:
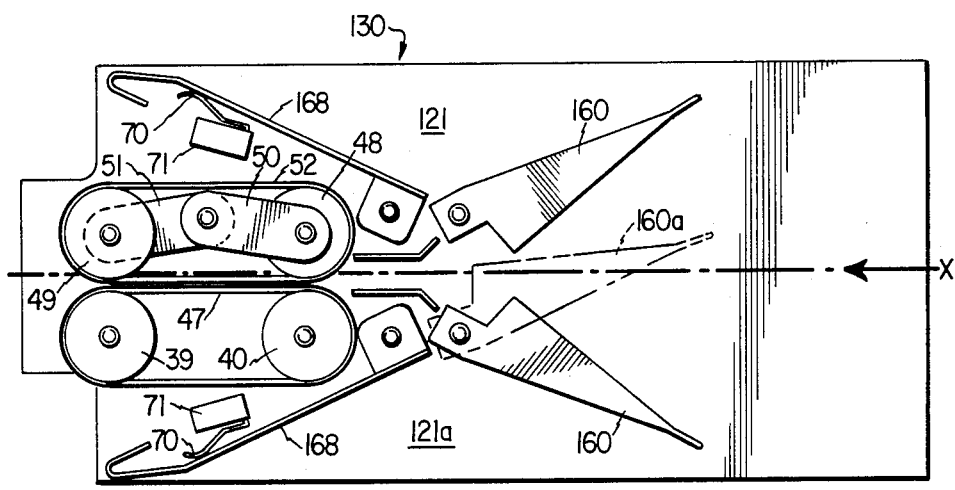
FIG. 4 is a plan or top view of another embodiment of the pocket module of the present invention.

Referring now to FIG. 4, another embodiment of pocket module 130 is disclosed wherein the gate and the kicker gate for each pocket 121 are combined into a single kicker gate element 160. Gate element 160, when in a first or deactuated position,, extends inwardly into pocket 121 at an angle with respect to centerline X of preferably at least 30°. When actuated by a solenoid (same as in above embodiment), gate element 160 moves to a second position 160a to intersect centerline X to divert a document from the transport and into pocket 121a. Upon deactuation, kicker gate element 160 moves back to its original or first position thereby "kicking" the tail of the document inward in pocket 121a and away from the point of entry. Bump plate 168 performs the same function as bump plate 68 in the above described embodiment.

What is claimed is:

1. An anti-jamming diverter means for diverting a document into a pocket of a document sorting machine from the centerline of a document transport through said machine, said means comprising:
   diverter means positioned adjacent said pocket for allowing a document to continue on said transport and by said pocket when in a first or deactuated position and for intersecting the centerline of said transport when in a second or actuated position to thereby divert a document from said transport into said pocket;
   means for moving said diverter to said first and second positions;
   kicker means positioned to extend inwardly into said pocket at an angle with respect to said centerline of said transport when in a first or deactuated position and for allowing entry of said document into said pocket when in a second or actuated position, said kicker means moving the tail of the document into said pocket when in said deactuated position; and
   means for moving said kicker means to said first and second positions;
   whereby said diverter means and said kicker means comprise:
   a kicker gate element positioned to extend inwardly into said pocket at an angle with respect to said centerline of said transport when said kicker gate element is in said first or deactuated position and to intersect said centerline of said transport when said kicker gate element is in said second or actuated position;
   and wherein said means for moving said diverter means and said kicker means comprise:
   means for moving said kicker gate element from said first position to said second position to divert a document from said transport into said pocket when actuated and for moving said kicker gate element from said second position to said first position to kick the tail of said document away from the point of entry into said pocket when deactuated.

2. The anti-jamminmg diverter means of claim 1 wherein said angle is at least 30°.

3. An anti-jamming diverter means for diverting a document into a pocket of a document sorting machine from the centerline of a document transport through said machine, said means comprising:
   diverter means positioned adjacent said pocket for allowing a document to continue on said transport and by said pocket when in a first or deactuated position and for intersecting the centerline of said transport when in a second or actuated position to thereby divert a document from said transport into said pocket;
   means for moving said diverter means to said first and said second positions;
   kicker means positioned to extend inwardly into said pocket at an angle with respect to said centerline of said transport when in a first or deactuated position and for allowing entry of said document into said pocket when in a second or actuated position, said kicker means moving the tail of the document into said pocket when in said deactuated positione; and
   means for moving said kicker means to said first and second positions;
   wherein said diverter means comprises:
   a gate positioned at the point of entry into said pocket and positioned to be substantially parallel to the centerline of said transport when in said first or deactuated position to allow a document to continue on said transport and by said pocket and to intersect said centerline of said transport when in a second or actuated to divert a document into said pocket;
   means for moving said gate from said first position to said second position to divert a document from said transport into said pocket;
   and wherein said kicker means comprises:
   a kicker gate positioned to extend inwardly into said pocket at an angle with respect to said centerline of said transport when in a first or deactuated position and to align with said gate when both said kicker gate and said gate are in said second or actuated positions; and
   means for moving said kicker gate to said second position when said gate is moved to said second position.

4. The diverter means of claim 3 wherein means for actuating said kicker gate comprises:
   a first solenoid.

5. The diverter means of claim 4 wherein said means for moving said gate comprises: a second solenoid.

6. The diverter means of claim 5 wherein said first solenoid is adapted to move said kicker gate from its said first position to its said second position when actuated and said kicker gate from its said second position to its said first position when deactuated.

7. The diverter means of claim 6 wherein said kicker gate is moved to its said second position simultaneously as said gate is moved to its said second position.

8. The diverter means of claim 7 wherein said angle between said kicker gate and the centerline of said transport is at least 30°.

* * * * *